United States Patent
Zinniel et al.

(10) Patent No.: US 7,236,166 B2
(45) Date of Patent: Jun. 26, 2007

(54) HIGH-RESOLUTION RAPID MANUFACTURING

(75) Inventors: Robert L. Zinniel, Plymouth, MN (US); John Samuel Batchelder, Somers, NY (US)

(73) Assignee: Stratasys, Inc., Eden Prairie, MN (US)

( * ) Notice: Subject to any disclaimer, the term of this patent is extended or adjusted under 35 U.S.C. 154(b) by 206 days.

(21) Appl. No.: 11/037,720

(22) Filed: Jan. 18, 2005

(65) Prior Publication Data
US 2006/0158456 A1    Jul. 20, 2006

(51) Int. Cl.
*G06T 15/00* (2006.01)

(52) U.S. Cl. ............... 345/419; 264/209; 264/340; 264/401; 700/119; 700/129

(58) Field of Classification Search ............ 345/419; 264/308, 401, 340, 219; 700/119, 129
See application file for complete search history.

(56) References Cited

U.S. PATENT DOCUMENTS

| | | | |
|---|---|---|---|
| 3,016,451 A | 1/1962 | Cornell | 226/190 |
| 3,381,812 A | 5/1968 | Cohen | 206/398 |
| 3,841,000 A | 10/1974 | Simon | 277/520 |
| 3,917,090 A | 11/1975 | Montagnino | 414/728 |
| 4,152,367 A | 5/1979 | Binsack et al. | 277/520 |
| 4,665,492 A | 5/1987 | Masters | 525/461 |
| 4,749,347 A | 6/1988 | Valavaara | 700/119 |
| 4,844,373 A | 7/1989 | Fike, Sr. | 206/389 |
| 4,898,314 A | 2/1990 | Stroh | 251/129.2 |
| 4,928,897 A | 5/1990 | Satou et al. | 355/72 |
| 4,961,154 A * | 10/1990 | Pomerantz et al. | 345/419 |
| 5,059,266 A | 10/1991 | Yamane et al. | 156/64 |
| 5,121,329 A | 6/1992 | Crump | 700/119 |
| 5,134,569 A | 7/1992 | Masters | 700/182 |
| 5,136,515 A | 8/1992 | Helinski | 700/119 |
| 5,140,937 A | 8/1992 | Yamane et al. | 118/315 |
| 5,149,548 A | 9/1992 | Yamane et al. | 118/315 |
| 5,169,081 A | 12/1992 | Goedderz | 242/557 |
| 5,204,055 A | 4/1993 | Sachs et al. | 264/128 |
| 5,216,616 A | 6/1993 | Masters | 264/401 |
| 5,257,657 A | 11/1993 | Gore | 264/308 |
| 5,263,585 A | 11/1993 | Lawhon et al. | 206/388 |
| 5,293,996 A | 3/1994 | Duncan | 206/204 |
| 5,303,141 A | 4/1994 | Batchelder et al. | 700/29 |
| 5,312,224 A | 5/1994 | Batchelder et al. | 415/90 |

(Continued)

FOREIGN PATENT DOCUMENTS

WO    WO 02/06029    1/2002

OTHER PUBLICATIONS

"Proceedings of the Time-Compression Technologies '98 Conference" East Midlands Conference Centre, Nottingham, UK, Oct. 13-14, 1998, Rapid News Publications plc.

(Continued)

*Primary Examiner*—Phu K. Nguyen
(74) *Attorney, Agent, or Firm*—Kinney & Lange, P.A.

(57) ABSTRACT

The present invention is a method for forming an object, the method comprising jetting a first material to form a plurality of layers that define a support structure increment, and extruding a second material to form a layer of the object. The layer of the object substantially conforms to an interior surface of the support structure increment.

20 Claims, 6 Drawing Sheets

U.S. PATENT DOCUMENTS

| | | | | |
|---|---|---|---|---|
| 5,340,433 | A | 8/1994 | Crump | 264/401 |
| 5,402,351 | A | 3/1995 | Batchelder et al. | 700/119 |
| 5,426,722 | A | 6/1995 | Batchelder et al. | 700/245 |
| 5,474,719 | A | 12/1995 | Fan et al. | 264/401 |
| 5,491,643 | A | 2/1996 | Batchelder | 345/419 |
| 5,503,785 | A | 4/1996 | Crump et al. | 264/308 |
| 5,587,913 | A | 12/1996 | Abrams et al. | 700/119 |
| 5,594,652 | A | 1/1997 | Penn et al. | 700/119 |
| 5,653,925 | A | 8/1997 | Batchelder | 264/113 |
| 5,695,707 | A | 12/1997 | Almquist et al. | 264/401 |
| 5,700,406 | A | 12/1997 | Menhennett et al. | 264/219 |
| 5,717,599 | A | 2/1998 | Menhennett et al. | 700/118 |
| 5,738,817 | A | 4/1998 | Danforth et al. | 264/603 |
| 5,764,521 | A | 6/1998 | Batchelder et al. | 700/196 |
| 5,765,740 | A | 6/1998 | Ferguson | 225/46 |
| 5,807,437 | A | 9/1998 | Sachs et al. | 118/688 |
| 5,866,058 | A | 2/1999 | Batchelder et al. | 264/237 |
| 5,893,404 | A | 4/1999 | Mendez et al. | 164/900 |
| 5,900,207 | A | 5/1999 | Danforth et al. | 264/603 |
| 5,932,055 | A | 8/1999 | Newell et al. | 156/245 |
| 5,939,008 | A | 8/1999 | Comb et al. | 264/308 |
| 5,943,235 | A | 8/1999 | Earl et al. | 700/98 |
| 5,968,561 | A | 10/1999 | Batchelder et al. | 700/119 |
| 6,004,124 | A | 12/1999 | Swanson et al. | 700/119 |
| 6,022,207 | A | 2/2000 | Dahlin et al. | 264/308 |
| 6,027,068 | A | 2/2000 | Lantsman | 226/190 |
| 6,054,077 | A | 4/2000 | Comb et al. | 264/70.7 |
| 6,067,480 | A | 5/2000 | Stuffle et al. | 700/109 |
| 6,070,107 | A | 5/2000 | Lombardi et al. | 700/119 |
| 6,085,957 | A | 7/2000 | Zinniel et al. | 226/43 |
| 6,095,323 | A | 8/2000 | Ferguson | 206/204 |
| 6,119,567 | A | 9/2000 | Schindler et al. | 83/565 |
| 6,127,492 | A | 10/2000 | Nagashima et al. | 525/461 |
| 6,129,872 | A | 10/2000 | Jang | 264/245 |
| 6,133,355 | A | 10/2000 | Leyden et al. | 264/245 |
| 6,162,378 | A | 12/2000 | Bedal et al. | 524/277 |
| 6,165,406 | A | 12/2000 | Jang et al. | 364/308 |
| 6,169,605 | B1 * | 1/2001 | Penn et al. | 358/1.1 |
| 6,175,422 | B1 | 1/2001 | Penn et al. | 345/419 |
| 6,193,922 | B1 * | 2/2001 | Ederer | 264/401 |
| 6,193,923 | B1 | 2/2001 | Leyden et al. | 264/401 |
| 6,214,279 | B1 | 4/2001 | Yang et al. | 264/482 |
| 6,228,923 | B1 | 5/2001 | Lombardi et al. | 700/119 |
| 6,238,613 | B1 | 5/2001 | Batchelder et al. | 264/404 |
| 6,257,517 | B1 | 7/2001 | Babish et al. | 242/366 |
| 6,261,077 | B1 | 7/2001 | Bishop et al. | 264/401 |
| 6,322,728 | B1 | 11/2001 | Brodkin et al. | 264/19 |
| 6,367,791 | B1 | 4/2002 | Calderon et al. | 269/900 |
| 6,547,995 | B1 | 4/2003 | Comb | 264/308 |
| 6,572,228 | B2 | 6/2003 | Kaga et al. | 347/102 |
| 6,578,596 | B1 | 6/2003 | Batchelder et al. | 137/338 |
| 6,629,011 | B1 | 9/2003 | Calderon et al. | 264/401 |
| 6,645,412 | B2 | 11/2003 | Priedeman, Jr. | 264/219 |
| 6,682,684 | B1 * | 1/2004 | Jamalabad et al. | 264/308 |
| 6,722,872 | B1 | 4/2004 | Swanson et al. | 425/375 |
| 6,730,252 | B1 | 5/2004 | Teoh et al. | 264/234 |
| 6,749,414 | B1 | 6/2004 | Hanson et al. | 425/375 |
| 6,776,602 | B2 | 8/2004 | Swanson et al. | 206/204 |
| 6,790,403 | B1 | 9/2004 | Priedeman, Jr. et al. | 264/442 |
| 6,814,907 | B1 | 11/2004 | Comb | 264/308 |
| 6,998,087 | B1 * | 2/2006 | Hanson et al. | 264/308 |
| 2003/0004600 | A1 | 1/2003 | Priedeman | 264/308 |
| 2003/0056870 | A1 | 3/2003 | Comb et al. | 264/308 |
| 2004/0222561 | A1 | 11/2004 | Hopkins | 264/489 |

OTHER PUBLICATIONS

"Chrysler Compares Rapid Prototyping Systems", by Terry Wohlers, *Computer-Aided Engineering*, vol. 11, No. 10, Oct. 1992.

"CAD Meets Rapid Prototyping", by Terry Wohlers, *Computer-Aided Engineering*, vol. 11, No. 4, Apr. 1992.

"Rapid Prototyping: An Update on RP Applications Technology Improvements, and Developments in the Industry", by Terry T. Wohlers, Wohlers Associates, Copyright 1991.

"The World of Rapid Prototyping", by Terry Wohlers, *Proceedings of the Fourth International Conference on Desktop Manufacturing*, Sep. 24-25, 1992, San Jose, CA.

"Installing a Rapid Prototyping System The Economic and Organizational Issues", by Terry T. Wohlers, Wohlers Associates, Copyright 1991.

* cited by examiner

HIGH-RESOLUTION RAPID MANUFACTURING

BACKGROUND OF THE INVENTION

The present invention relates to the fabrication of three-dimensional objects from computer designs using additive process techniques. In particular, the present invention relates to the rapid manufacturing of three-dimensional objects using fused deposition modeling and jetting techniques.

Rapid prototyping of three-dimensional objects from computer-generated designs is used to form parts for a variety of functions, such as aesthetic judgments, proofing a mathematical model, concept visualization, forming hard tooling, studying interference and space allocation, and testing functionality. Rapid prototyping techniques have also spread into rapid manufacturing markets, where copies of an object are quickly created, and each object exhibits physical properties comparable to objects made from hard tooling.

Rapid manufacturing applications demand a high throughput, a good surface finish, and strengths, toughness, and chemical resistance equaling that of injection-molded parts. To achieve the desired functional qualities, it is desirable to build rapid manufactured objects out of thermoplastic materials, such as acrylonitrile butadiene styrene (ABS), polycarbonate, and polysulfone, all of which exhibit good physical properties.

Fused deposition modeling is a popular rapid prototyping technique developed by Stratasys, Inc., Eden Prairie, Minn., which builds three-dimensional objects from thermoplastics materials. Fused deposition modeling machines build three-dimensional objects by extruding flowable modeling material (e.g., thermoplastic materials) through a nozzle carried by an extrusion head, and depositing the modeling material in a predetermined pattern onto a base. The modeling material is extruded in fluent strands, referred to as "roads". Typically, the object is formed in a layer-wise fashion by depositing a sequence of roads in an x-y plane, incrementing the position of the extrusion head along a z-axis (perpendicular to the x-y plane), and then repeating the process. Movement of the extrusion head with respect to the base is performed under computer control, in accordance with design data provided from a computer aided design (CAD) system. The extruded modeling material fuses to previously deposited modeling material, and solidifies upon a drop in temperature to form a three-dimensional object resembling the CAD model.

Another technique for building objects from solidifiable materials is known as jetting, which deposits droplets of modeling material from nozzles of a jetting head, such as an inkjet printhead. After dispensing, the jetted material is solidified (e.g., cured by exposing the material to ultraviolet radiation).

The surfaces of three-dimensional objects developed from layered manufacturing techniques of the current art (e.g., fused deposition modeling and jetting) are textured or striated due to their layered formation. Curved and angled surfaces generally have a "stair step" appearance, caused by layering of cross-sectional shapes which have square edge profiles. Although the stair-stepping does not effect the strength of the object, it does detract aesthetically. Generally, the stair-stepping effect is proportional to the layer thickness, and decreases as the layer thickness decreases.

Current fused deposition modeling machines, such as systems commercially available from Stratasys, Inc., build three-dimensional objects having layer thicknesses ranging from about 180 micrometers (about 0.007 inches) to about 760 micrometers (about 0.030 inches) and road widths ranging from about 125 micrometers (about 0.005 inches) to about 1500 micrometers (about 0.060 inches). Thermoplastic materials flow through extrusion tips having inner diameters typically ranging from about 125 micrometers (about 0.005 inches) to about 500 micrometers (about 0.020 inches), at dispensing rates designed to produce the desired layer thicknesses and road widths.

The fused deposition modeling machines generally operate at voxel rates of about 500 hertz (Hz), extruding thermoplastic materials at a dispensing rate of about three cubic inches per hour. The resulting object resolution is generally about 130 micrometers (about 0.005 inches), depending on the object geometry. The high viscosities of thermoplastic materials (e.g., about 500 Poise) and their low thermal conductivities (e.g., about 0.2 watts/meter-° C.) generally constrains the extrusion of these plastics through a smaller extrusion tip (to produce thinner layers) while moving the extruder at a higher frequency (to decrease build time).

Jetting techniques of the current art can eject small droplets of material at a voxel rate of about 2 kilohertz (kHz) to about 200 kHz. The thicknesses of jetted layers generally range from about 5 micrometers (about 0.0002 inches) to about 150 micrometers (about 0.006 inches), with a typical thickness before planarization of about 25 micrometers (about 0.001 inches). Accordingly, the resulting object resolution is generally about 50 micrometers (about 0.002 inches), depending on the object geometry. However, known jettable materials do not have the desirable material properties of the extrudable thermoplastic materials. As such, jetted objects are generally less suitable for rapid manufacturing applications. There is a need for techniques that increase the speed and resolution of building three-dimensional objects from materials that exhibit good physical properties, such as thermoplastic materials.

BRIEF SUMMARY OF THE INVENTION

The present invention relates to a method and system that provide a high-resolution, rapidly manufactured, three-dimensional object by combining jetting techniques with the principles of fused deposition modeling. A first material is jetted to form a plurality of layers that define an increment of a support structure. The jetting allows the increment of the support structure to have a high-resolution interior surface. A second material is extruded to form a layer of the three-dimensional object, where the layer of the three-dimensional object substantially conforms to the high-resolution interior surface of the increment of the support structure. The jetting and the extrusion are repeated until the three-dimensional object and the support structure are formed. Accordingly, the support structure functions as a high-resolution mold that is filled concurrently with its construction. This allows three-dimensional objects to be formed from materials with good physical properties, at high deposition rates, and with high surface resolutions.

DETAILED DESCRIPTION

Figure 1:
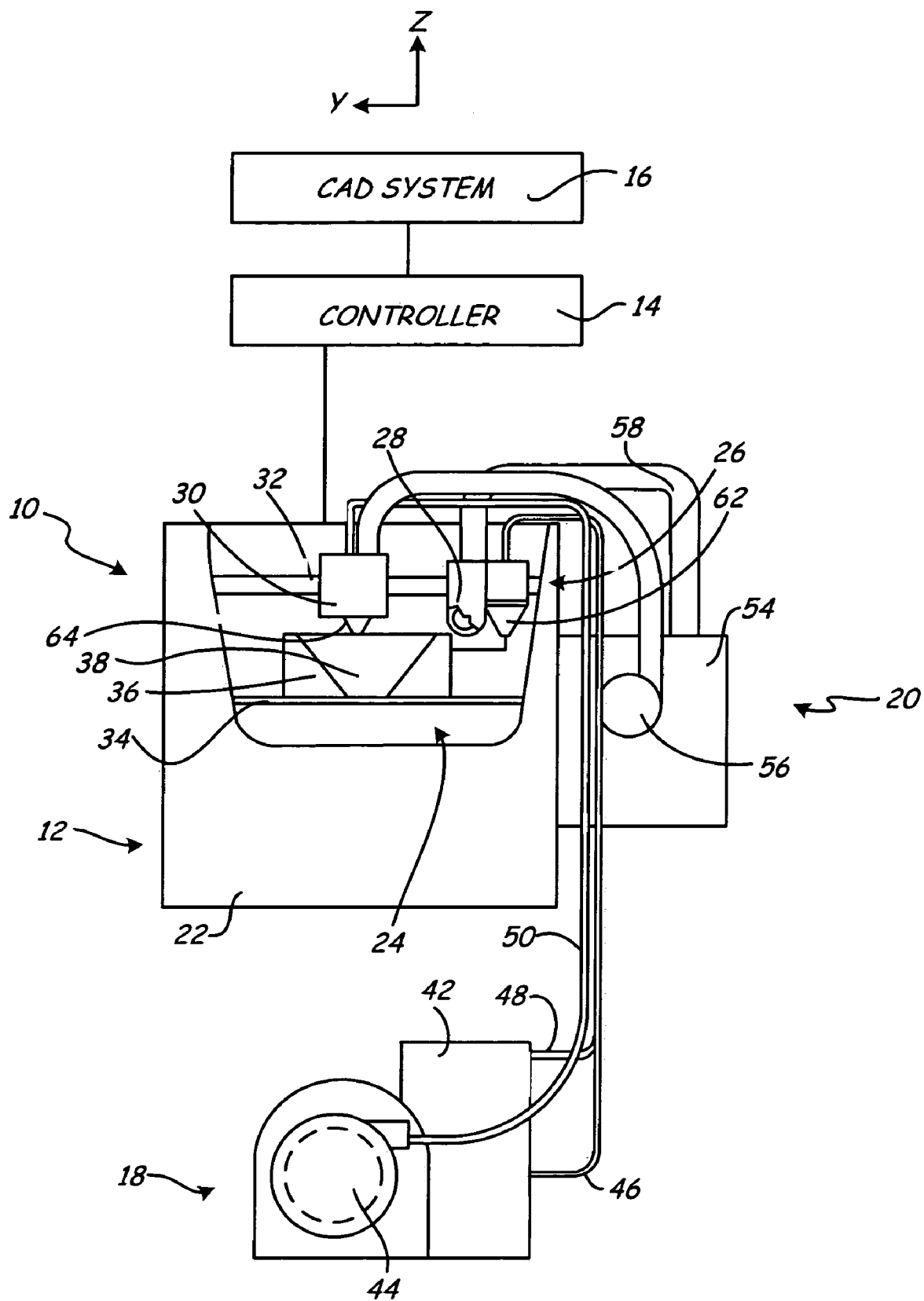
FIG. 1 is a side view of a three-dimensional modeling system of the present invention with a portion broken away.
Figure 2:
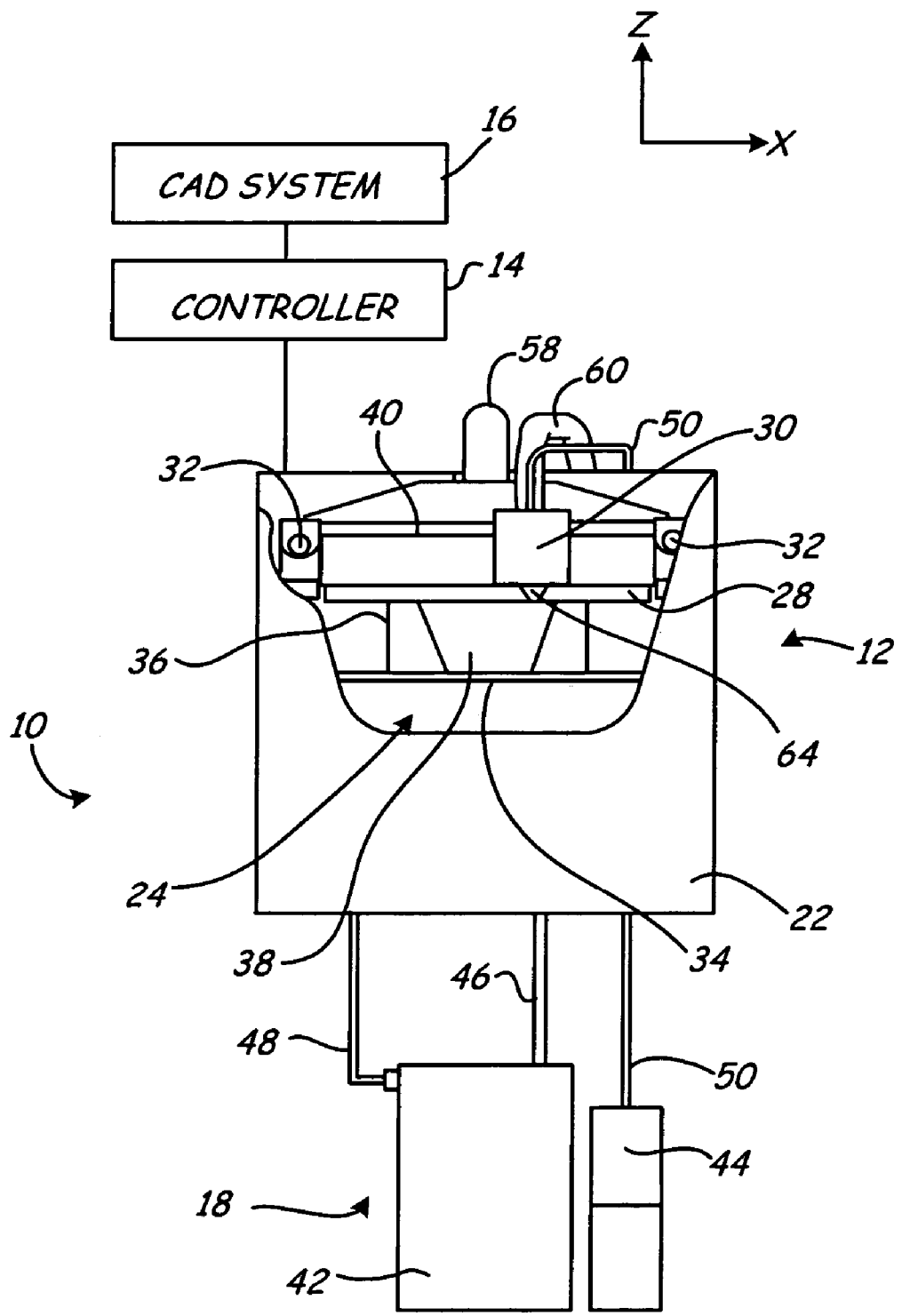
FIG. 2 is a front view of the three-dimensional modeling system of the present invention with a portion broken away.

FIGS. 1 and 2 are respectively a side view and a front view of a three-dimensional modeling system 10, which is an apparatus for manufacturing three-dimensional objects pursuant to the present invention. The system 10 includes a build chamber 12, a controller 14, a CAD system 16, a material supply portion 18, and a circulation system 20.

The build chamber 12 includes chamber walls 22 and an interior portion 24 disposed within the chamber walls 22. The interior portion 24 is shown as a broken away portion in FIGS. 1 and 2. Within the interior portion 24, the build chamber 12 also includes a jetting head 26, a planarizer 28, an extrusion head 30, guide rails 32, a platform 34, a support structure 36, and a three-dimensional object 38. As discussed below, the jetting head 26 jets a support material onto the platform 34 to build the support structure 36 in increments. Interspersed with the jetting of the support structure 36, the extrusion head 30 extrudes a modeling material onto the platform 34 to build the object 38 within the support structure 36.

The jetting head 26 and the planarizer 28 are coupled together as a single unit, and are supported by the guide rails 32, which extend along a y-axis within the build chamber 12. This allows the jetting head 26 and the planarizer 28 to move back-and-forth along the y-axis. The extrusion head 30 is supported by the guide rails 32 and by additional guide rails 40, where the additional guide rails 40 extend along an x-axis within the build chamber 12. The guide rails 32 and 40 allow the extrusion head 30 to move in any direction in a plane defined by the x-axis and the y-axis.

The platform 34 provides a working surface for building the support structure 36 and the object 38, and is disposed below the jetting head 26, the planarizer 28, and the extrusion head 30 in a direction along a z-axis. The height of the platform 34 along the z-axis may be adjusted in a conventional manner to vary the distance between the platform 34 and the jetting head 26, the planarizer 28, and the extrusion head 30.

The material supply portion 18 includes a support material supply 42, a modeling material supply 44, a support material supply line 46, a support material return line 48, and a modeling material supply line 50. The support material supply 42 is connected to the jetting head 26 of the build chamber 12 with the support material supply line 46, which allows support material stored in the support material supply 42 to be pumped to the jetting head 26. Support material left unused after building the support structure 36 may be transported back to the support material supply 42 via the support material return line 48. The modeling material supply 44 is connected to the extrusion head 30 of the build chamber 12 with the modeling material supply line 50, which allows modeling material stored in the modeling material supply 44 to be transferred to the extrusion head 30.

The circulation system 20 includes a vacuum 54, a cooling fan 56, a vacuum conduit 58, and a cooling conduit 60. The vacuum 54 is connected to the planarizer 28 of the build chamber 16 with the vacuum conduit 58. Similarly, the cooling fan 56 is connected to the extrusion head 30 of the build chamber 16 with the cooling conduit 60. The cooling fan 56 provides cool air to the extrusion head 30 to maintain the extrusion head 30 at a desired temperature.

The jetting head 26 of the build chamber 12 includes an array of downward facing jets 62, which eject droplets of support material according to a predetermined pattern to build the support structure 36, layer-by-layer. In the present embodiment, the jets 62 span the entire work space in single array. In order to nullify the effects of a malfunctioning nozzle (e.g., a clogged or dead nozzle), the jetting head 26 may shift along the x-axis to randomize the locations of the jets 62 relative to the work space. This may be accomplished with the use of third set of guide rails (not shown) that extend along the x-axis, parallel to the guide rails 40 for the extrusion head 30. In alternative embodiments, the jets 62 may only span a portion of the work space, with the jetting head 26 making multiple passes in order to cover the entire work space at each incremental height along the z-axis (e.g., raster scan and interlaced raster scan patterns). Additionally, the jets 62 may be offset at an angle from the x-axis to increase the resolution of each pass (e.g., a saber angle).

The jetting head 26 may be a commercial inkjet printhead, such as trade designated GALAXY, NOVA, and SPECTRA printheads/jetting assemblies, all of which are commercially available from Spectra, Inc. Lebanon, NH. In one embodiment, the jetting head 26 uses drop-on-demand technology. A typical jetting head of the current art, using drop-on-demand technology, reliably ejects droplets with about 38 micrometer diameters at a rate of about three kHz per nozzle, and has a nozzle density of more than 300 nozzles per inch. In an alternative embodiment, the jetting head 26 uses continuous drop technology. Continuous drop technology generally provides a higher throughput, but the droplet size has more variability. In another alternative embodiment, the jetting head 26 may be customized and/or may have as few as one jet. For example, the jetting head 26 may move rapidly along the y-axis and electrostatically deflect droplets into position.

In the jetting heads of the current art, the droplets ejected exhibit variable sizes, which results in a deposition rate uncertainty. To address this uncertainty, the jetting head 26 is calibrated to over-deposit the support material. The excess material may then be subsequently removed by the planarizer 28. The planarizer 28 may be any instrument suitable for planarizing the deposited layers. In the present embodiment, the planarizer 28 is a rotating cutter, which planarizes layers the support structure by physically cutting away the support material. Alternatively, the planarizer 28 may be solvent-assisted lapping planarizer, which incorporates a solvent-coated roller that dissolve portions of the support structure 36. This is particularly suitable for use with small features of the support structure 36, which may otherwise be damaged by the shear forces induced by conventional planarizers. Another alternative for the planarizer 28 includes a smooth roller that is particularly suitable for use with certain materials of the support structure 36, as discussed below.

The planarizer 28 desirably extends slightly below the jetting head 14. In this arrangement, the jetted support material is planarized when it builds up to a height along the z-axis equal to the height of the planarizer 28. This prevents the jets 62 from colliding with the jetted layers of the support structure 36. In alternative embodiments, the planarizer 28 may be de-coupled from the jetting head 26, allowing the planarizer 28 to be positionable at various heights along the z-axis. This provides control of the intervals at which the planarizer 28 acts upon the jetted support material.

The support material removed by the planarizer 28 is withdrawn from the build chamber 16 through the vacuum conduit 58 by the vacuum 54. The vacuum 46 pulls material away from the build chamber 16 as the material is removed by the planarizer 28. The planarizer 28 and the vacuum 54 may be any suitable planarizer system for planarizing and removing excess support material. For example, in lieu of the vacuum 54, a negatively-charged static roller may be used to collect and remove the excess support material while the planarizer 28 is in use.

The extrusion head 30 may be of any type that receives a thermoplastic material and dispenses the thermoplastic material in a molten state, such as an extrusion head for fuse deposition modeling. The extrusion head 30 includes an extrusion tip 64, which extrudes bulk layers of modeling material according to a predetermined pattern to build the object 38, layer-by-layer. In one embodiment of the present invention, the extrusion tip 64 of the extrusion head 30 may include a large orifice, capable of extruding thicker bulk layers of modeling material than generally used with existing fuse deposition modeling systems.

An example of a suitable thickness for the bulk layers of modeling material includes about 760 micrometers (0.03 inches). This is several times greater than used with current fuse deposition modeling systems. The terms "thickness" and "layer thickness" are defined herein as distances along the z-axis shown in FIGS. 1 and 2. The large orifices of the extrusion tip 64 also allow the extrusion rates of the modeling material to be higher than the rates of existing fuse deposition modeling systems. An example of a suitable extrusion flow rate from the extrusion tip 64 includes at least about 1.6 liters/hour (about 100 inches$^3$/hour). In comparison, extrusion rates of existing fuse deposition modeling systems are about 0.05 liters/hours (about 3 inches$^3$/hour).

The jetting head 26, the planarizer 28, the extrusion head 30, and the platform 34 of the build chamber 14 are each managed by the controller 14. The controller 14 may be any suitable computer system for receiving data from the CAD system 16 and directing deposition and planarization patterns for the support structure 36 and the object 38.

The CAD system 16 provides a digital representation of the object 38 to the controller 14, from which the extrusion pattern for the extrusion head 30 is determined. The CAD system 16 also creates a digital representation of the support structure 36 from the digital representation of the object 38. In one embodiment, the CAD system 16 first identifies data representing an exterior surface of the object 38. The CAD system 16 then creates the digital representation of the support structure 36 in which the support structure 36 has an interior surface with a geometry defined by the data representing the exterior surface of the object 38. As such, the support structure 36 is designed as a matching mold for the object 38. The CAD system 16 provides the digital representation of the support structure 36 to the controller 14, from which the jetting pattern for the jetting head 26 is determined.

As used herein, the term "exterior surface" of the object 38 includes all surfaces of the object 38 that are exposed to external conditions, such as the geometric outside surface of the object 38, exposed hollow portions of the object 38, and exposed channels that extend within the object 38. As used herein, the term "interior surface" of the support structure 36 includes all surfaces of the support structure 36 that geometrically correspond to the exterior surface of the object 38.

In alternative embodiments, the controller 14 and the CAD system 16 may be a single system that provides the digital representations of the support structure 36 and the object 38, and manages the components of the system 10. Additionally, the digital representation of the support structure 36 may be created through a variety of data manipulation techniques.

The interior region 24 of the build chamber 12 is desirably maintained at a temperature greater than the creep-relaxation temperature of the modeling material. Building the object 38 in an environment with a temperature higher than the creep-relaxation temperature of the modeling material, followed by a gradual cooling, relieves stresses imposed on the object 38. If the environment is too cool, the thermal gradient between the newly-extruded hot modeling material and the cooled pre-existing modeling material, together with the thermal expansion coefficient of the modeling material, generates a warp or curl. On the other hand, if the environment is too hot, the modeling material will not adequately solidify, and the object 38 will droop.

Examples of suitable temperatures for the interior region 24 of the build chamber 16 range from about the solidification temperature of the modeling material to about the glass transition temperature of the modeling material. Examples of particularly suitable temperatures for the build chamber 16 range from about the creep-relaxation temperature of the modeling material to about the glass transition temperature of the modeling material.

When the interior region 24 of the build chamber 16 is maintained at about the glass transition temperature of the modeling material, the modeling material slumps and substantially conforms to the interior surface of the support structure 36. As such, the support structure 36 functions in a similar manner to a mold of an injection molding process. However, in contrast to the high pressures at which plastic are shot into an injection mold, the extruded roads of modeling material in the present invention will exert low pressures (primarily hydrostatic pressures) on the support structure 36. Therefore, the support structure 36 is only required to exhibit moderate strengths to support the object 38.

It is desirable to thermally isolate the jetting head 26 from the interior region 24 of the build chamber 16. Prolonged high temperatures may potentially degrade the support materials and/or the jetting head 26. Various means may be used to shield the jetting head 26 from the heat. For example, the jetting head 26 may be cooled by pumping cool air with the a second cooling fan (not shown) that shares the vacuum conduit 58 with the vacuum 54. Other shielding techniques may be used, as will be apparent to those skilled in the art, including a deformable baffle insulator, as is disclosed in Swanson et al., U.S. Pat. No. 6,722,872, which is incorporated herein by reference in its entirety.

In order to accurately build the support structure 36 and the object 38, the controller 14 registers the relative positions between the jetting head 26 (in directions along the y-axis) and the extrusion head 30 (in directions along the x-axis and the y-axis). Sensors may communicate with the controller 14 to perform registration on start-up, and to monitor registration of the jetting head 26 and the extrusion head 30 during a build process.

When implementing the present invention, the planarizer 28 is desirably positioned to avoid collisions with the object 38. Similarly, the extrusion tip 64 of the extrusion head 30 is desirably positioned to avoid collisions with the support structure 36. In one embodiment, the planarizer 28 planarizes the jetted support material to a height along the z-axis that is slightly below the position of the extrusion tip 64. This effectively prevents the extrusion tip 64 from colliding with the support structure 36 as the extrusion head 30 travels across the work space. In an alternative embodiment, collision may be avoided by lowering the platform 34 before the extrusion and raising it back up after the extrusion is completed.

In addition to avoiding collision, registration is also important for building the support structure 36 and the object 38 with accurate geometries. In order to ensure that the layers of support material and modeling material are progressing at the same height along the z-axis, registration must be maintained between the planarizer 28 and the extrusion tip 64 of the extrusion head 30. As such, the system 10 of the present invention may include sensors to register and to maintain registration between the various components of the system 10 to avoid collisions, and to monitor the deposited materials.

Figure 3:
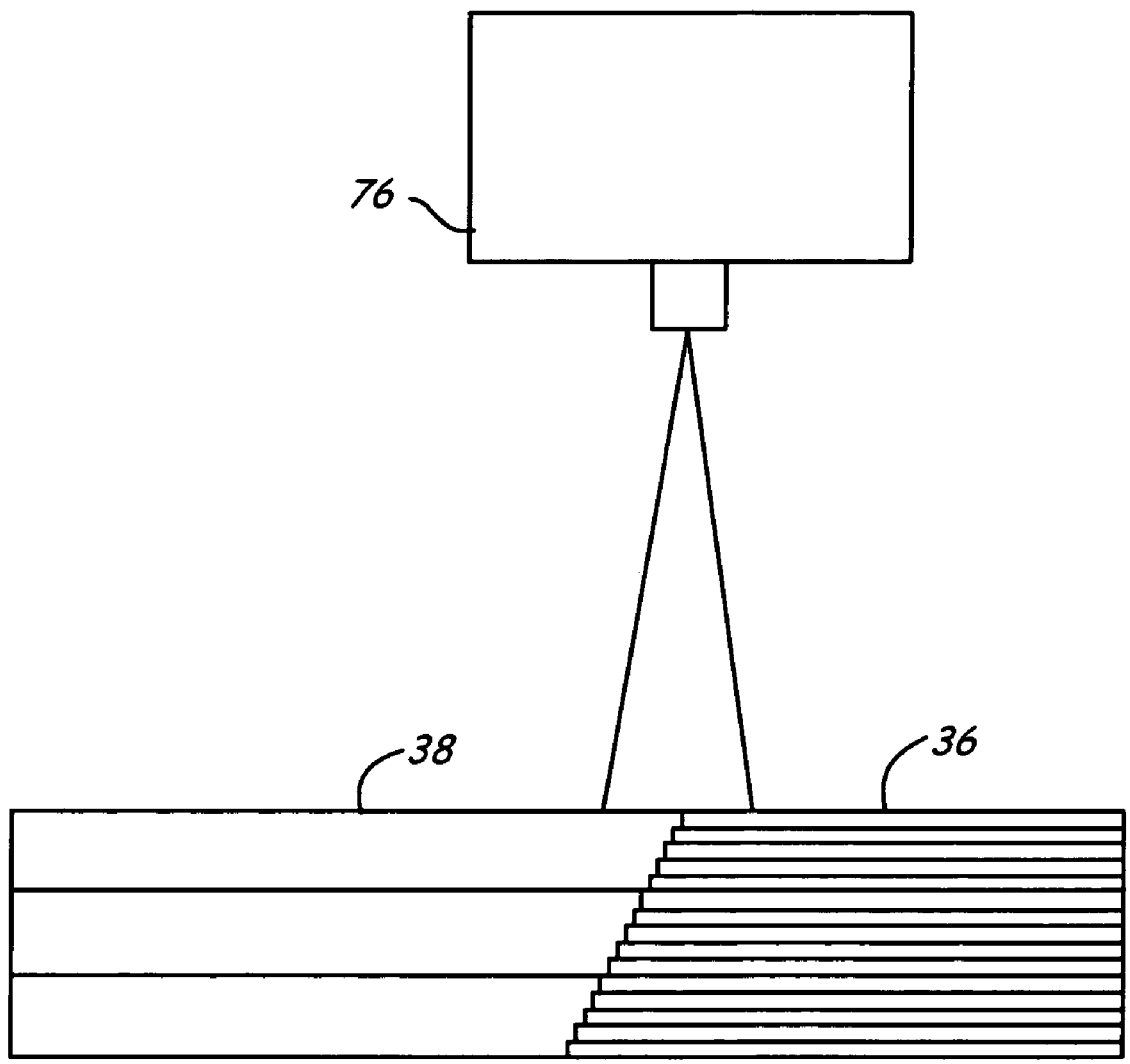
FIG. 3 is a illustration of a camera monitoring deposited layers.

FIG. 3 is an illustration of the layers of the support structure 36 and the object 38 being monitored by a camera 76. The camera 76 is an optical ranging sensor that maintains registration during a build process by monitoring the relative heights of the support structure 36 and the object 38. The camera 76 senses the heights along the z-axis of the support structure 36 and the object 38. The camera 76 then compares the heights to determine if further jetting, extrusion, planarization, or other actions should be taken. Feedback from sensors, such as the camera 76, may also be used to determine how many layers of support material are jetted. If the height of the support structure 36 is below a desired height, additional layers of support material may be jetted and planarized. Alternatively, if the height of the support structure exceeds a desired height, subsequent jetting of layers of support material may be halted.

The system 10 allows the formation of the support structure 36 and the object 38 pursuant to the present invention. Based on the digital representation of the support structure 36, the jetting head 26 jets support material to build the support structure 36. Similarly, based on the digital representation of the object 38, the extrusion head 30 extrudes modeling material to build the object 38. This build process allows the support structure 36 to function as a high resolution mold for the object 38.

Figure 4:
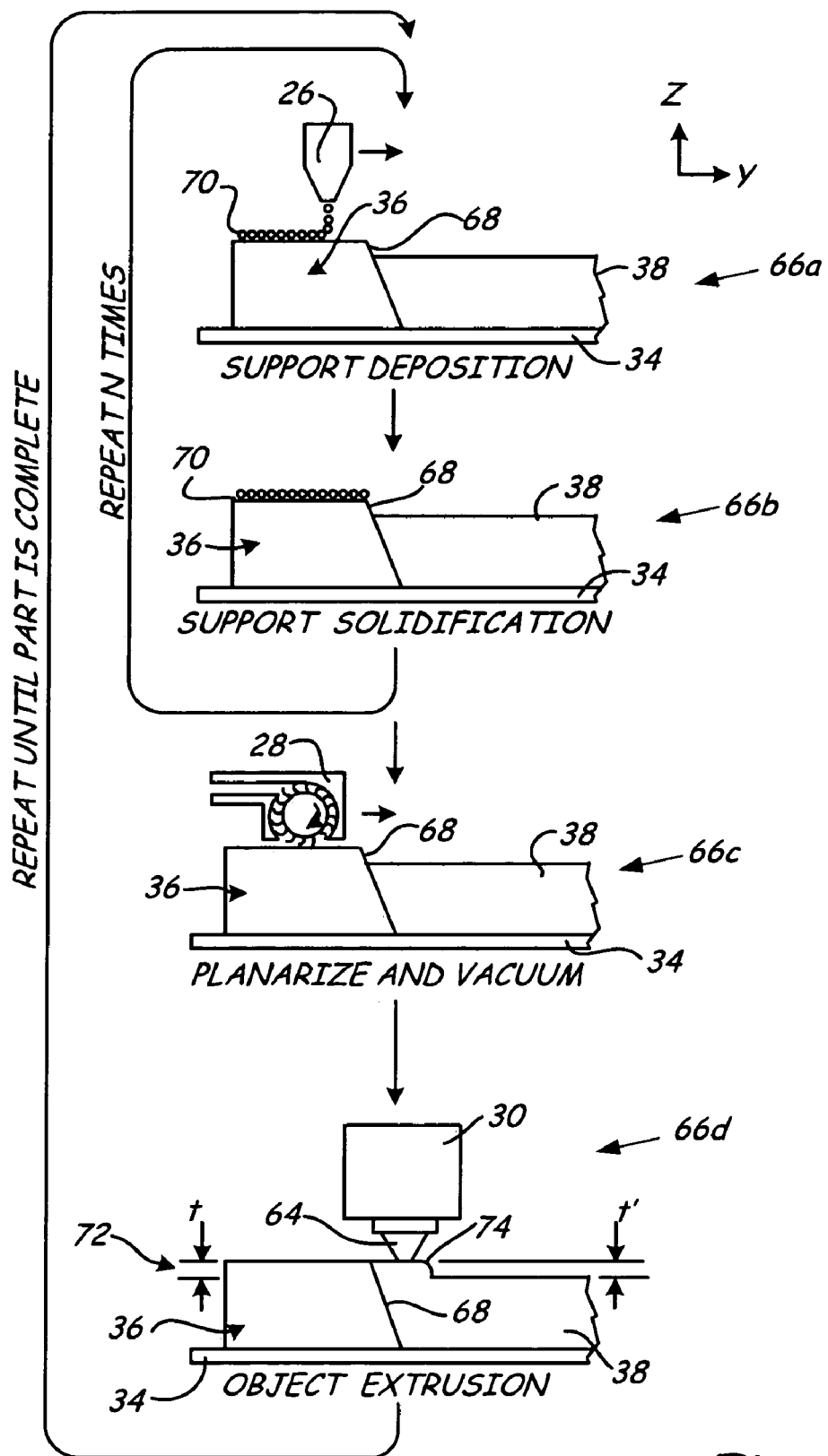
FIG. 4 is a diagram illustrating a build process pursuant to the present invention.

FIG. 4 is a diagram illustrating a build process of the support structure 36 and the object 38 with the system 10 described in FIGS. 1 and 2. FIG. 3 includes building steps 66a–66d, in which the support structure 36 and the object 38 are built on the platform 34, where the support structure 36 has an high-resolution interior surface 68. In step 66a, the jet 64 deposits support material to form a jetted layer 70. This further increases the height of the support structure 36 along the z-axis. In step 66b, the support material of the jetted layer 70 substantially solidifies, which may be performed in a variety of manners depending of the support material used. Steps 66a and 66b are then repeated to form N jetted layers of support material until a desired increment is reached, where the desired increment has a thickness in a direction along the z-axis. In one embodiment, N is an integer value of at least four (i.e., at least four jetted layers are deposited). In another embodiment, N is an integer value of at least ten (i.e., at least ten jetted layers are deposited).

The "substantial solidifying" of the jetted layers (e.g., the jetted layer 70) does not require that the support materials be completely solidified before the subsequent jetted layer is deposited. The present invention only requires that the layers of the support structure 58 are capable of supporting subsequently deposited layers of the support structure 58 and of supporting the object 56.

As shown in step 66c, after the desired increment of the support structure 36 is reached, the planarizer 28 planarizes the deposited support material. The dislodged material is then removed form the build chamber 12 by the vacuum 54. In a typical jetting process of the current art, the planarizing step removes from about 5% to about 50% of a jetted layer's thickness, with a typical value of about 20%. Planarizing after multiple layers of support material are jetted provides the benefit that it is forgiving of small errors in the heights of the extruded layers of modeling material. This is because planarizing the jetted support material only after jetting several layers will generally avoid collision by the planarizer 26 with the previously extruded layers of modeling material.

In an alternative embodiment, the height of the planarizer 28 may be set such that each layer of support material will be planarized after being jetted, and prior to jetting the subsequent layer of support material. In this case, care must be taken to ensure that the height of the extruded layers of modeling material remains below the planarizer 28, such as by using sensors.

As shown in step 66d, after planarization, the jetted layers are reduced to a support structure increment 72 having a thickness t. The extrusion head 30 then extrudes modeling material to fill the support structure 36 and build the object 56. Inside the extrusion head 30, the modeling material is heated to a flowable temperature (typically between about 180° C. and about 300° C., depending on the modeling material being extruded). The incoming modeling material itself acts as a piston, creating a pumping action that forces the melted modeling material to extrude from the extrusion tip 64 of the extrusion head 30. The modeling material is extruded adjacent to the interior surface 68 of the support structure increment 72, to form a bulk layer 74 having a thickness t'. In one embodiment of the present invention, the layer thickness t' for each bulk layer of modeling material (e.g., the bulk layer 74) is approximately equal to the layer thickness t for the corresponding support structure increment (e.g., the support structure increment 72).

Steps 66a–66d are then continued, building and filling the support structure 36, increment-by-increment, until the object 38 is complete. The support structure according to the present invention (e.g., the support structure 36) may be immersive (i.e., fully surrounding the completed object 38), omitted from the top and bottom surfaces of the object 38, or omitted from the top surface of the object 38.

Figure 5:
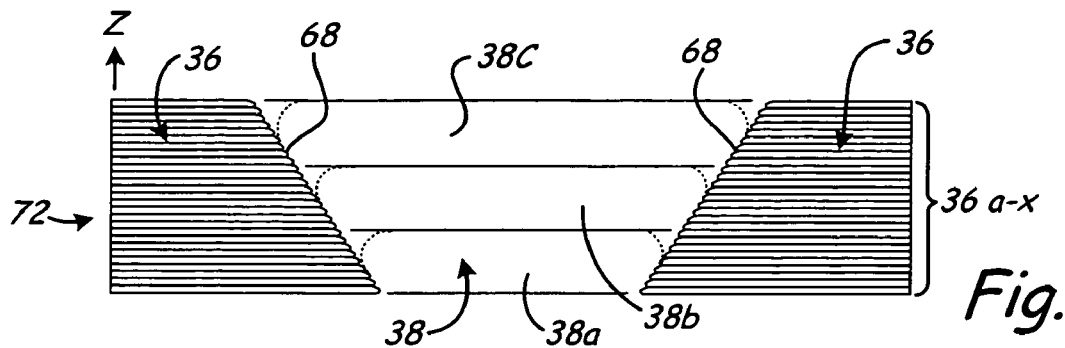
FIG. 5 is an illustration of material layers deposited pursuant to the present invention.

FIG. 5 is an illustration of a support structure increment of the support structure 36 and the object 38, as described in FIG. 4. As shown, the support structure 36 is formed from twenty-four jetted layers 36a–36x of support material, and includes the interior surface 68. The object 38 is formed from three bulk layers 38a–38c of modeling material. The dotted lines illustrate the initial shape of the bulk layers 38a–38c upon extrusion. As discussed above, the interior region 24 of the build chamber 12 may be maintained at a temperature that causes the modeling material to slump and substantially conform to the interior surface 68 of the support structure 36. This allows the object 38 to be built with an exterior surface defined by the high resolution interior surface 68 of the support structure 36. In the embodiment shown in FIG. 5, eight jetted layers (e.g., the jetted layers 38a–38h) are jetted per extruded bulk layer (e.g., the bulk layer 38a). As such, the surface resolution of the object 38 is increased eight-fold by imposing the jetted layer resolution on the extruded bulk layers 38a–38c.

After the support structure 36 and the object 38 are built, they may be removed from the heated environment of the build chamber 12 as a joined block. At this point, there may be thermal gradients in the block that can generate significant forces on the support structure 36 as the molding material solidifies. The cooling time required to prevent significant thermal gradients generally depends on the size of the object 38. However, by the time the modeling material can generate significant force, the modeling material is generally rigid enough to retain its shape even if the support material cracks. Additionally, the use of support materials with high thermal conductivities may increase the uniform cooling of the object 38. Alternatively, after the support structure 36 and the object 38 are constructed, holes may be formed through the support structure 36 to allow coolant fluids to flow through. This may also increase the uniform cooling of the object 38.

Upon completion, the support structure 36 may be removed in any manner that does not substantially damage the object 38. Examples of suitable techniques for removing the support structure 36 from the object 38 include physical removal (i.e., breaking the support structure 36 apart with applied force), dissolving at least a portion of the support structure in a solvent (discussed below), and combinations thereof. After the support structure 36 is removed, the object 38 is completed, and may undergo conventional post-building steps as individual needs may require.

Examples of suitable modeling materials for use with the present invention include any material that is extrudable with a fused deposition modeling system. Examples of particularly suitable molding materials include thermoplastic materials, such as ABS, polycarbonate, polysulfone, and combinations thereof. The modeling material may be supplied from the modeling material supply 44 in the form of a flexible filament wound on a supply reel, or in the form of a solid rod, as disclosed in Crump, U.S. Pat. No. 5,121,329, which is incorporated by reference in its entirety. Alternatively, the modeling material may be pumped in liquid form from a reservoir.

The modeling materials may also be moisture sensitive. To protect the integrity of moisture-sensitive modeling materials, the modeling material supply 44 may be kept dry using an air tight filament loading and drying system, such as is disclosed in Swanson et al., U.S. Pat. No. 6,685,866, which is incorporated herein by reference in its entirety.

Examples of suitable support materials for use with the present invention include any material that is jettable from an inkjet printhead and that exhibits sufficient strength to support the modeling material during the building process, such as solvent-dispersed materials, ultraviolet-curable materials, and combinations thereof. The support materials also desirably solidify quickly with a good surface finish, have low deposition viscosities, are low cost, exhibit low environmental impact (e.g., are non-toxic materials), are capable of withstanding the extrusion temperatures of the modeling material for a short period of time, and are capable of withstanding the temperature of the build chamber 12 for extended periods of time.

Examples of particularly suitable support materials include solvent-dispersed materials, such as a sucrose solution and a salt solution. Examples of suitable component concentration for sucrose solutions include about 73% by weight sucrose ($C_{12}H_{22}O_{11}$) in water at about 90° C., and about 80% by weight sucrose in water at about 120° C. Each of these sucrose solutions exhibits a viscosity of about 18 centipoises. After jetting, the water solvent volatilizes in interior region 24 of the build chamber 16, which leaves the residual sucrose at the jetted locations to build the support structure 36. Salt solutions, such as a sodium chloride in water solution function in the same manner as sucrose solutions, and also exhibit high thermal conductivities (about five watts/meter-° C.). This assists in the uniform cooling of the object 38.

In addition to being environmentally friendly, sucrose solutions and salt solutions are also soluble in a variety of solvents. This allows the support structure 36 to be removed by exposure to solvents, such as water. For example, after the support structure 36 and the object 38 are built, the support structure 36 may be removed by dissolving, at least a portion of, or all of the support structure 36 in water to expose the finished object 38. This may be performed with minimal operator attention and minimal damage to the geometry or strength of the object 38.

When building the support structure 36 and the object 38, it is desirable to have low contact angles between the deposited materials. The low contact angles increase the extent that the modeling material conforms to the resolution of the support structure 36. However, low contact angles also increase the bonding of the support materials and the modeling materials at the interface between the support structure 36 and the object 38. Physical removal of the support structure 36 may damage the exterior surface of the object 38. As such, damage to the object 38 may be avoided by dissolving at least a portion of the support structure 36 in a solvent to remove the support structure 36.

The solubility of solvent-dispersed materials, such as sucrose solutions and salt solutions, also allows the planarizer 28 to include smooth planarizers. In this embodiment, portions of the jetted solvent (e.g., water) remain non-volatilized with the sucrose/salt for periods of time after jetting. The non-volatilized solvent assists the planarizer 28 in removing the excess material of the support structure 36 in a manner similar to solvent-assisted lapping planarizers, except that additional solvent is not required.

As discussed above, the present invention allows three-dimensional objects to be formed from modeling materials that exhibit good physical properties, and which are deposited in bulk layers at rapid rates. The three-dimensional objects also exhibit high resolutions obtained from the jetted support structures, which enhance the aesthetic qualities of the three-dimensional objects. The present invention provides a throughput rate for modeling material of at least about 0.5 liters/hour (about 30 inches$^3$/hour), with an accuracy of about 51 micrometers/micrometer (about 0.002 inches/inch), and a surface finish of about 30 micrometers (about 0.001 inches) root-mean-square.

As generally discussed above, it is necessary to build support structures (e.g., the support structure 36) when creating three-dimensional objects (e.g., the object 38) in a layer-wise fashion, to support portions of the objects under construction. In the discussions of FIGS. 1–5, the jetted layers of support material are sequentially deposited to form interior surfaces (e.g., the interior surface 68) with angles up to about 90 degrees. In these cases, each layer of support material is jetted into an underlying layer of support material or modeling material.

However, some three-dimensional object geometries require that support structures have interior surfaces that project at angles substantially greater than 90 degrees. In these cases, portions of layers of support material are jetted into areas without underlying support. In such areas, particularly with interior surfaces having angles greater than about 30 degrees off vertical, the jetted support material itself requires additional support. These overhanging regions present a special case, where modified build approaches may be used to compensate for the lack of support at the overhanging regions.

Figure 6A:
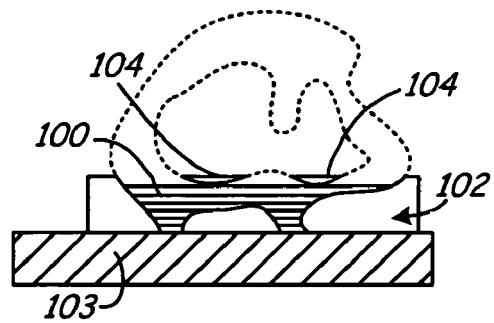
FIGS. 6A–6D are schematic representations of a three-dimensional object and a support structure under construction.
Figure 6B:
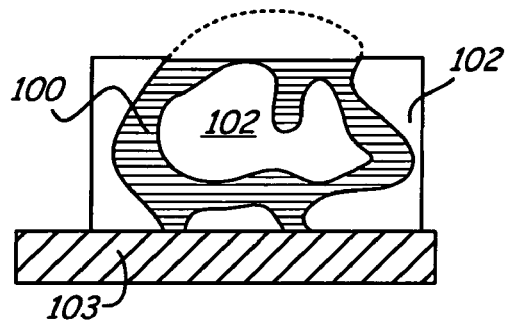
Figure 6C:
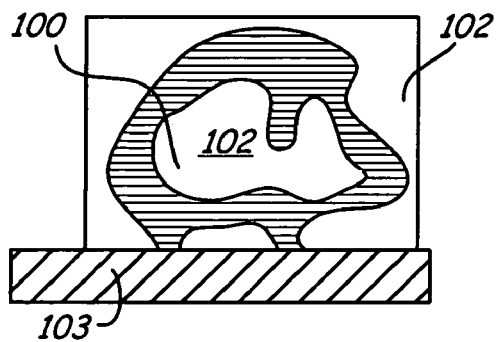
Figure 6D:
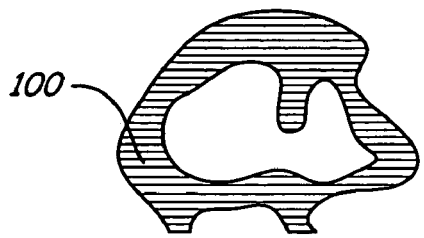

FIGS. 6A–6D are schematic representations of a three-dimensional object 100 and a support structure 102 under construction on a platform 103. As shown in FIG. 6A, the support structure 102 includes overhanging regions 104, which each have lateral portions that project over the object 100 at angles substantially greater than 90 degrees. These overhanging regions 104 require additional support. FIGS. 6B and 6C show the continued building and completion of the part 100 in the support structure 102. FIG. 6D shows the completed part 100, removed from the support structure 102.

A number of approaches may be taken to support overhanging support structure regions, such as those required to build the object 100. Examples of suitable approaches include an extruded thin-road wall approach, an extruded bulk-road wall approach, a chinking approach, a lost wax approach, a support stilts approach, and a thermoplastic ploughing approach. These approaches are described below in FIGS. 7–11 with reference to an increment i of the overhanging region 104.

FIGS. 7–11 are illustrations depicting the approaches to taken support the overhanging region 104, and each include the object 100 (with bulk layers 100a–100c) and the overhanging region 104 of the support structure 102, as shown in FIG. 6A.

Figure 7:
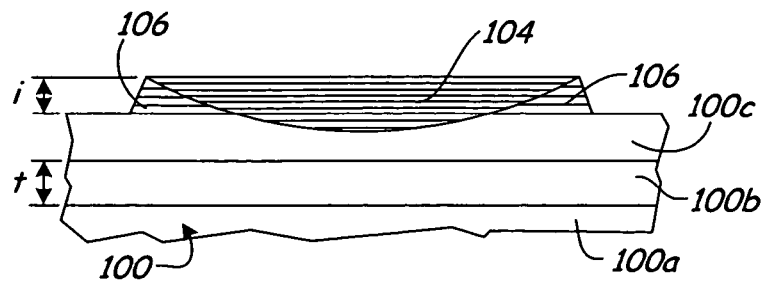
FIG. 7 is a illustration of the three-dimensional object and a support structure as shown in FIG. 6A, depicting an extruded thin-road wall approach.
Figure 8:
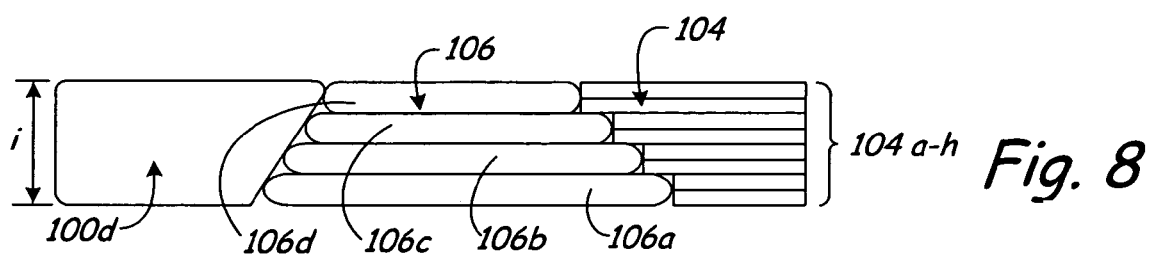
FIG. 8 is an illustration of the three-dimensional object and a support structure as shown in FIG. 7.

FIGS. 7 and 8 depict the extruded thin-road wall approach to support the overhanging region 104. As shown in FIG. 7, the extruded thin-road wall approach involves pre-extruding thin layers 106 of modeling material into the areas under the overhanging region 104 in the increment i. This forms supporting walls on the bulk layer 100c, which provides support to the overhanging region 104. The thin layers 106 may be deposited from a second extrusion tip, which may be carried either by a separate extrusion head or a second tip on the primary extrusion head 30. Alternatively, the extrusion tip 64 of the primary extrusion head 30 may include a size-adjustable orifice.

In one embodiment, the modeling material may be deposited in M thin layers 106, where M is an integer greater than or equal to 2. The thickness of each of the thin layers 106 is about t/M, so that the thickness of the supporting walls (i.e., the increment i) is about equal to the thickness t' of the bulk layers 100a–100c. As shown in FIG. 7, four thin layers 106 are extruded (i.e., M=4). When subsequent bulk layers of modeling material (not shown) are extruded to fill the increment i, the thin layers 106 and the bulk layers of modeling material fuse together to form a unitary object 100.

Applying the thin layers 106 on the bulk layer 100c provides a good surface finish in these regions where the modeling material is applied before the adjacent sidewalls of the support structure 102 are formed. Accordingly, the thin layers 106 are desirably applied in layers no thicker than about half the thickness of a bulk layers 100a–100c, in order to increase resolution. To match the surface finish of the rest of the part, the thicknesses of the thin layers 106 may be about equal to the thicknesses t of the support material layers.

As shown in FIG. 8, the overhanging region 104 is formed in an increment i from support structure layers 104a–104h. The modeling material is extruded in thin layers 106a–106d. The thin layers 106a–106d form a supporting wall 108, which supports the support structure layers 104a–104h as they are jetted. The bulk layer 100d is deposited adjacent the supporting wall 108 to fill the increment i. Because four thin layers 106 (i.e., the thin layers 106a–106d) were extruded, the surface resolution of the object 100 at the increment i shown in FIGS. 7 and 8 will be four times greater than by extrusion of the bulk layer 104d alone.

The extruded bulk-road wall approach is similar to the extruded thin-road wall approach, except that bulk layers of modeling material are pre-extruded into the areas under the overhanging region 104 prior to forming the overhanging region 104. When subsequent bulk roads of modeling material are extruded to fill the support structure increment i, the various bulk roads of modeling material fuse together to form a unitary object 100. In contrast to the extruded thin-road wall approach, after removing the support structure 102 from the object 100 formed by the extruded bulk-road approach, the pre-extruded areas of the object 100 will exhibit rough surface finishes. These rough areas may be smoothed by a post-processing step, such as machining, ion milling, solvent lapping, smearing with a hot surface, grinding, abrasion, and vapor smoothing.

In the extruded thin-road wall approach and the extruded bulk-road wall approach, caution must be taken to avoid collision of the planarizer (e.g., the planarizer 20) with the pre-extruded layers (e.g., the thin layers 106a–106d). Such collision can be avoided by timing the planarizing of the jetted support material so that support material is planarized only when it reaches a height along the z-axis that is greater than that of the pre-extruded layers. Allowing modeling material of the thin layers 106a–106d to cool sufficiently to support planarizing shear prior to dispensing overlaying jetted supports will further protect reliability of the object 100.

In the case of extruded thin layers 106a–106d, collision may be avoided by interspersing the extrusion of the thin layers 106a–106d with the jetting of the support structure layers 104a–104h in a systematic fashion. First, one or more thin layers 106 may be extruded. Then, support structure layers 104 are jetted up to at least the height of the extruded thin layers 106. Planarizing is desirably not performed until the support structure layers 104 reach or exceed the height of the extruded thin layers 106. This prevents collisions between the planarizer with the thin layers 106. Additionally, collision between the extrusion tip (e.g., the extrusion tip 26) and support layers is prevented by planarizing the support material before extrusion of subsequent thin layers 106. Deposition of the thin layers 106, the support structure layers 104, and planarizing is continued until the support structure increment i is completed. The bulk layer 100s of modeling material may then be deposited to fill the support structure increment i.

Table 1 provides an example of a sequence for depositing material to support the overhanging region 104 in the support structure increment i, with reference to FIG. 8.

TABLE 1

| Step | Process | Layer |
|------|---------|-------|
| 1 | Extrusion | Thin layer 106a |
| 2 | Jetting | Support structure layer 104a |
| 3 | Jetting | Support structure layer 104b |
| 4 | Planarization | Deposited support structure layers |
| 5 | Extrusion | Thin layer 106b |
| 6 | Jetting | Support structure layer 104c |
| 7 | Jetting | Support structure layer 104d |
| 8 | Planarization | Deposited support structure layers |
| 9 | Extrusion | Thin layer 106c |
| 10 | Jetting | Support structure layer 104e |
| 11 | Jetting | Support structure layer 104f |
| 12 | Planarization | Deposited support structure layers |
| 13 | Extrusion | Thin layer 106d |
| 14 | Jetting | Support structure layer 104g |
| 15 | Jetting | Support structure layer 104h |
| 16 | Planarization | Deposited support structure layers |
| 17 | Extrusion | Bulk road 100d |

As shown in Table 1 and FIG. 8, for each bulk layer (e.g., the bulk layer 100d), there are four thin layers 106 (i.e., M=4) and eight support structure layers 114 (i.e., N=8). As such, following the extrusion of each thin layer 106, N/M support layers 104 are jetted, where N/M is two.

Figure 9:
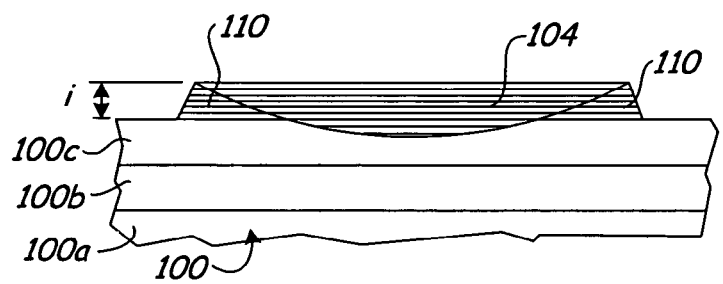
FIG. 9 is a illustration of the three-dimensional object and a support structure as shown in FIG. 6A, depicting a chinking approach.

FIG. 9 depicts the chinking approach to support the overhanging region 104. The chinking approach involves jetting layers 110 of a second modeling material into the areas under the overhanging region 104 to form supporting walls. The second modeling material is desirably not removable with the support structure 102 (e.g., not water soluble), and desirably exhibits good adhesion to the extruded modeling material. Jetting of the second modeling material may be performed along with jetting of support material to build the corresponding overhanging region 104. When subsequent bulk layers of modeling material (not shown) are extruded to fill the support structure increment i, the extruded modeling material fuses to the jetted second modeling material, so that the jetted second modeling material forms a portion of the object 100.

Figure 10:
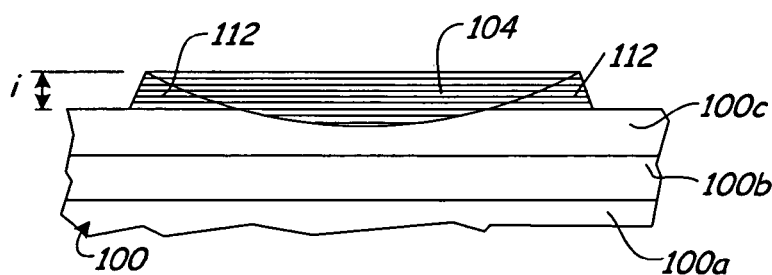
FIG. 10 is a illustration of the three-dimensional object and a support structure as shown in FIG. 6A, depicting a lost wax approach.

FIG. 10 depicts the lost wax approach to support the overhanging region 104. The lost wax approach involves jetting layers 112 of an alternative material into the areas under the overhanging region 104 to form supporting walls. The alternative material is desirably selected for to exhibit good melt properties (e.g., wax). When subsequent bulk layers of modeling material (not shown) are extruded to fill the support structure increment i, the heat of the modeling material melts the alternative material, and displaces it. The lost wax approach and the chinking approach may each be accomplished with a second jetting head, with its own material supply.

Figure 11:
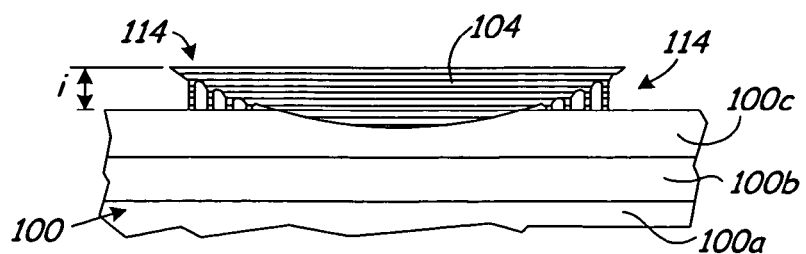
FIG. 11 is a illustration of the three-dimensional object and a support structure as shown in FIG. 6A, depicting a support stilts approach.

FIG. 11 depicts the support stilts approach to support the overhanging region 104. The support stilts approach involves jetting support material to build stilts 114 as the support structure increment i is formed. Modeling material is then extruded to fill the increment i, such that the stilts 126 become embedded in the part 100. Where the stilts 114 join the region 104, the stilts 114 fan out to provide a contiguous downward facing sidewall. After removal of the support structure 102 from the completed object 100, pinholes or some embedded support material will remain on the upward faces of the object 100.

The thermoplastic ploughing approach involves depositing bulk roads of modeling material in areas that would be occupied by the overhanging region 104, so that the modeling material fills its allotted volume plus some of the volume that should be occupied by the support structure 102. This can be done simultaneously with filling the support structure increment i. A hot finger may then displace the modeling material from the support structure region 104, and support material may then be jetted into the resulting cavity.

Although the present invention has been described with reference to preferred embodiments, workers skilled in the art will recognize that changes may be made in form and detail without departing from the spirit and scope of the invention.

The invention claimed is:

1. A method for forming an object, the method comprising:
jetting a first material to form a plurality of layers that define a support structure increment, the support structure increment having an interior surface; and
extruding a second material to form a layer of the object, wherein the layer of the object substantially conforms to the interior surface of the support structure increment, and has a thickness greater than thicknesses of each of the plurality of layers defining the support structure increment.

2. The method of claim 1, and further comprising forming the object in an environment maintained at a temperature ranging from about a creep-relaxation temperature of the second material to about a glass transition temperature of the second material.

3. The method of claim 1, and further comprising planarizing the support structure increment.

4. The method of claim 1, wherein the thickness of the layer of the object is approximately equal to a thickness of the support structure increment.

5. The method of claim 1, wherein the first material comprises a solvent-dispersed material.

6. The method of claim 1, wherein the second material comprises a thermoplastic material.

7. The method of claim 1, and further comprising sensing a height of the support structure increment, wherein the number layers of the plurality of layers of first material varies based on the sensed height.

8. The method of claim 1, and further comprising compensating for a lack of support at an overhanging region of the support structure increment, wherein the overhanging region is a region of the support structure increment where the interior surface projects an angle greater of at least about 30 degrees off vertical.

9. The method of claim 8, wherein the compensating comprises extruding the second material to form a plurality of thin layers to support the overhanging region, wherein each of the plurality of thin layers has a thickness that is at most about half of a thickness of the layer of the object.

10. The method of claim 8, wherein the compensating comprises jetting a third material to form a plurality of thin layers to support the overhanging region.

11. A method for forming an object, the method comprising:
providing a digital representation of the object, the digital representation of the object comprising data that represents an exterior surface of the object;
forming a digital representation of a support structure, the digital representation of the support structure comprising data that represents an interior surface of the support structure, wherein the interior structure of the support structure has a geometry defined by the exterior surface of the object;

jetting a plurality of layers to form a support structure increment based on the digital representation of the support structure, wherein the support structure increment includes a portion of the interior surface of the support structure;

extruding a layer of the object based on the digital representation of the object, wherein the layer of the object substantially conforms to the interior surface of the support structure increment, and has a thickness greater than thicknesses of each of the plurality of layers forming the support structure increment; and repeating the jetting and the extruding to form the object and the support structure.

12. The method of claim 11, wherein the method further comprises forming the object in an environment maintained at a temperature ranging from about a creep-relaxation temperature of a material of the layer of the object to about a glass transition temperature of the material of the layer of the object.

13. The method of claim 11, and further comprising planarizing the support structure increment.

14. The method of claim 11, wherein the thickness of the layer of the object is approximately equal to a thickness of the support structure increment.

15. The method of claim 11, and further comprising:
cooling the object to substantially solidify the object; and
removing the support structure from the object by dissolving at least a portion of the support structure in a solvent.

16. A system for forming an object, the system comprising:

a jetting head for jetting a first material to form layers of a support structure, wherein the support structure has an interior surface;

an extrusion head having an extrusion tip for extruding a second material to form layers of the object, wherein each of the layers of the object exhibit thicknesses that are greater than thicknesses of each of the layers of the support structure; and a build chamber for maintaining a temperature that allows the layers of the object to substantially conform to the interior surface of the support structure.

17. The system of claim 16, and further comprising a planarizer for planarizing the layers of the support structure.

18. The system of claim 16, and further comprising a sensor for sensing a height of the layers of the support structure.

19. The system of claim 16, wherein the extrusion head further comprises a second extrusion tip.

20. The system of claim 16, wherein the temperature ranges from about a creep-relaxation temperature of the second material to a glass transition temperature of the second material.

* * * * *